(12) United States Patent
Darst et al.

(10) Patent No.: US 8,127,451 B1
(45) Date of Patent: Mar. 6, 2012

(54) METHOD FOR SUPPORTING LOADS IN A COAL-DUST-LADEN ENVIRONMENT

(75) Inventors: Robert Darst, Louisville, KY (US); Carl Coslow, Prospect, KY (US); Ray Gulley, Louisville, KY (US)

(73) Assignee: Republic Industries International, Louisville, KY (US)

( * ) Notice: Subject to any disclaimer, the term of this patent is extended or adjusted under 35 U.S.C. 154(b) by 964 days.

(21) Appl. No.: 12/105,729

(22) Filed: Apr. 18, 2008

(51) Int. Cl.
*B21D 53/10* (2006.01)

(52) U.S. Cl. .......... 29/898.12; 29/898.1; 29/898.13; 29/898.14; 29/898.15; 29/458; 29/527.2; 29/DIG. 62

(58) Field of Classification Search .............. 29/898.02, 29/898.1, 898.12–898.15, 458, 527.2, DIG. 62; 384/907, 912, 913
See application file for complete search history.

(56) References Cited

U.S. PATENT DOCUMENTS 3,463,026 A * 8/1969 MacPherson et al. ........ 474/223
(Continued)

*Primary Examiner* — Sarang Afzali
(74) *Attorney, Agent, or Firm* — Camoriano and Associates; Theresa Fritz Camdriano

(57) ABSTRACT

A bearing for use in a particulate-laden environment uses the particles as a lubricant between the opposed bearing surfaces, which are coated with a tungsten carbide coating that is harder than the particles.

3 Claims, 11 Drawing Sheets

U.S. PATENT DOCUMENTS

| | | |
|---|---|---|
| 3,743,556 A | 7/1973 | Breton et al. |
| 3,839,774 A * | 10/1974 | Jackson, Jr. ............... 29/898.1 |
| 3,936,295 A * | 2/1976 | Cromwell et al. ............ 75/252 |
| 4,146,951 A * | 4/1979 | Howlett ...................... 29/452 |
| 5,236,116 A | 8/1993 | Solanki et al. |

\* cited by examiner

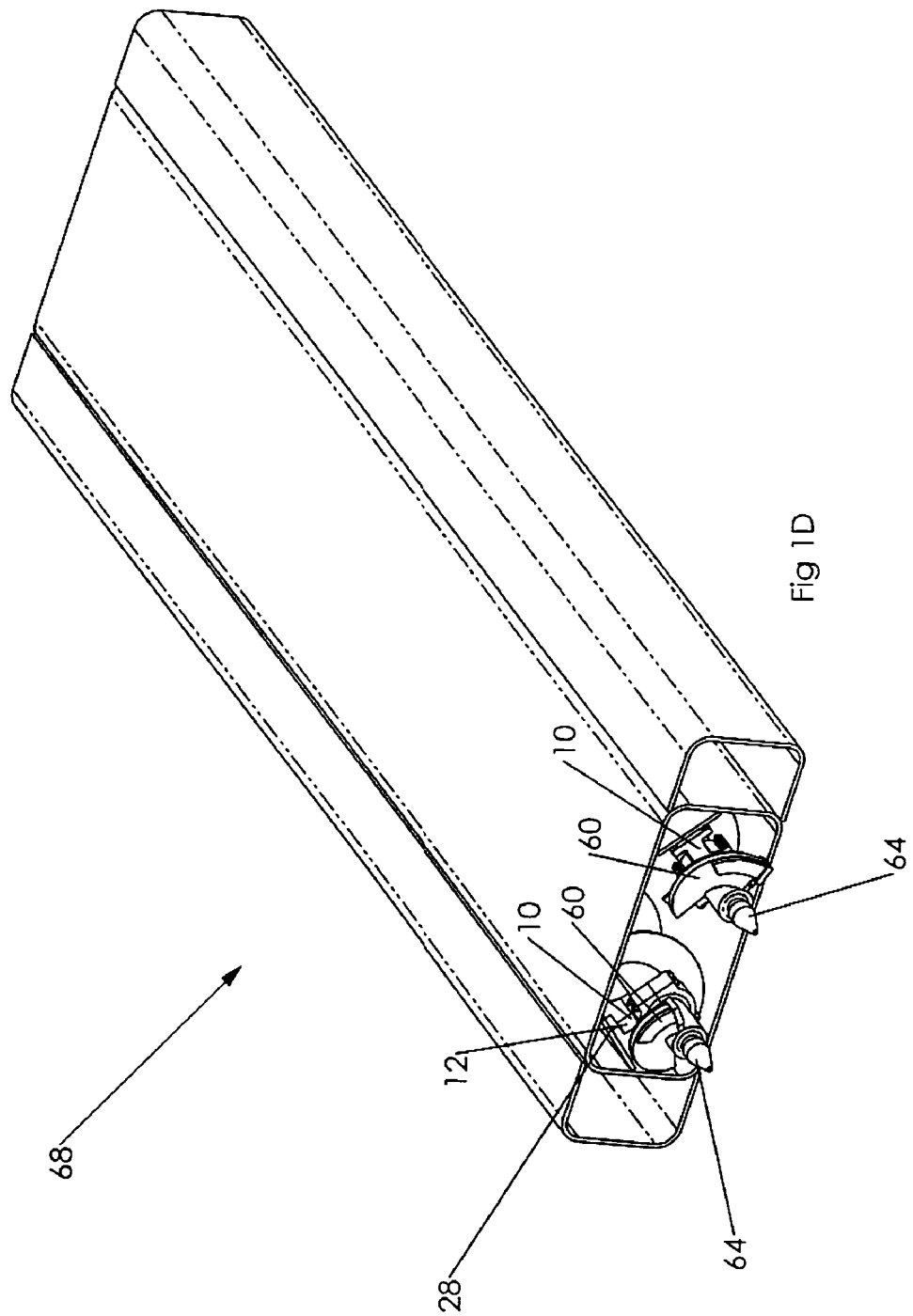

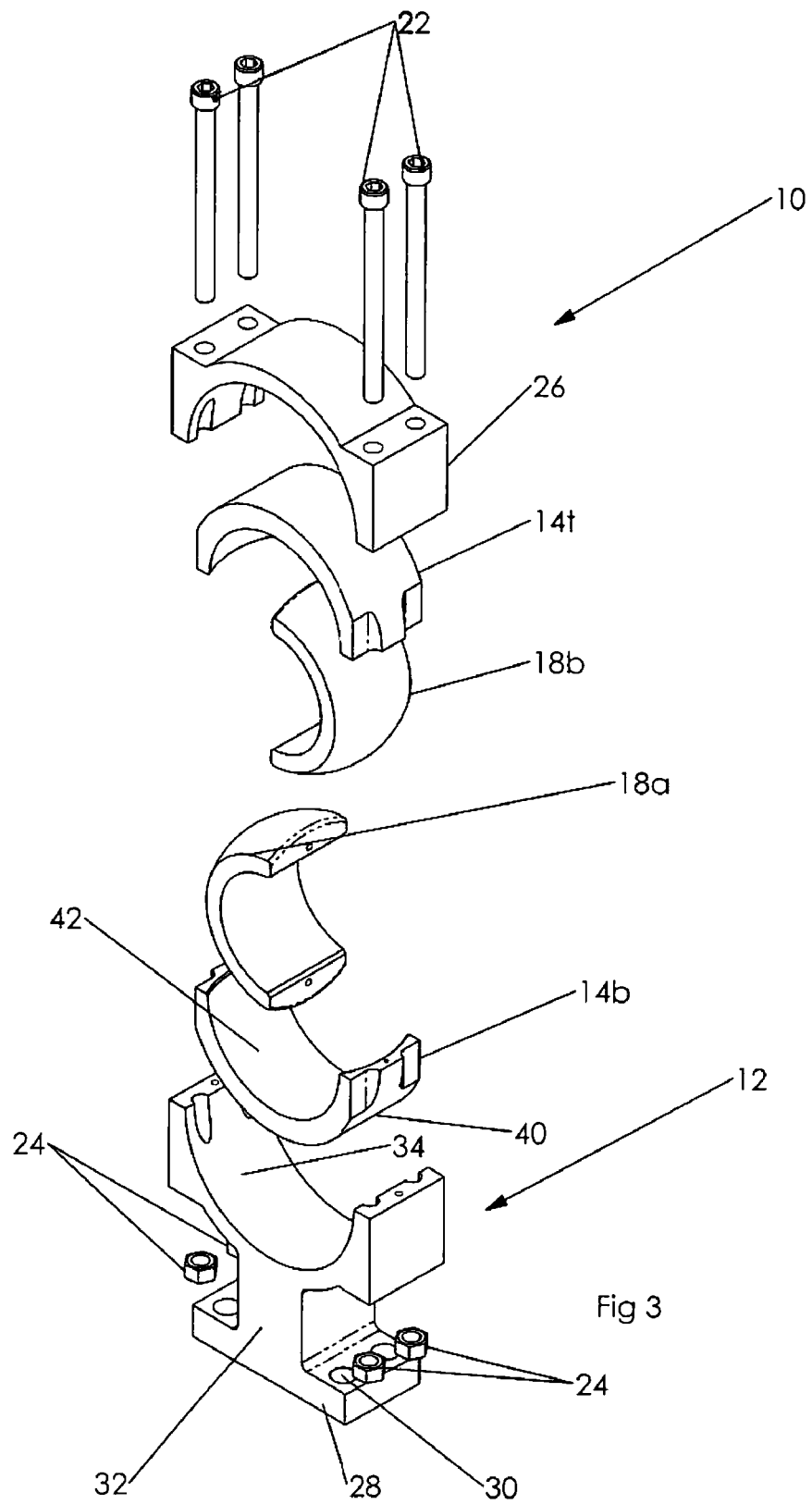

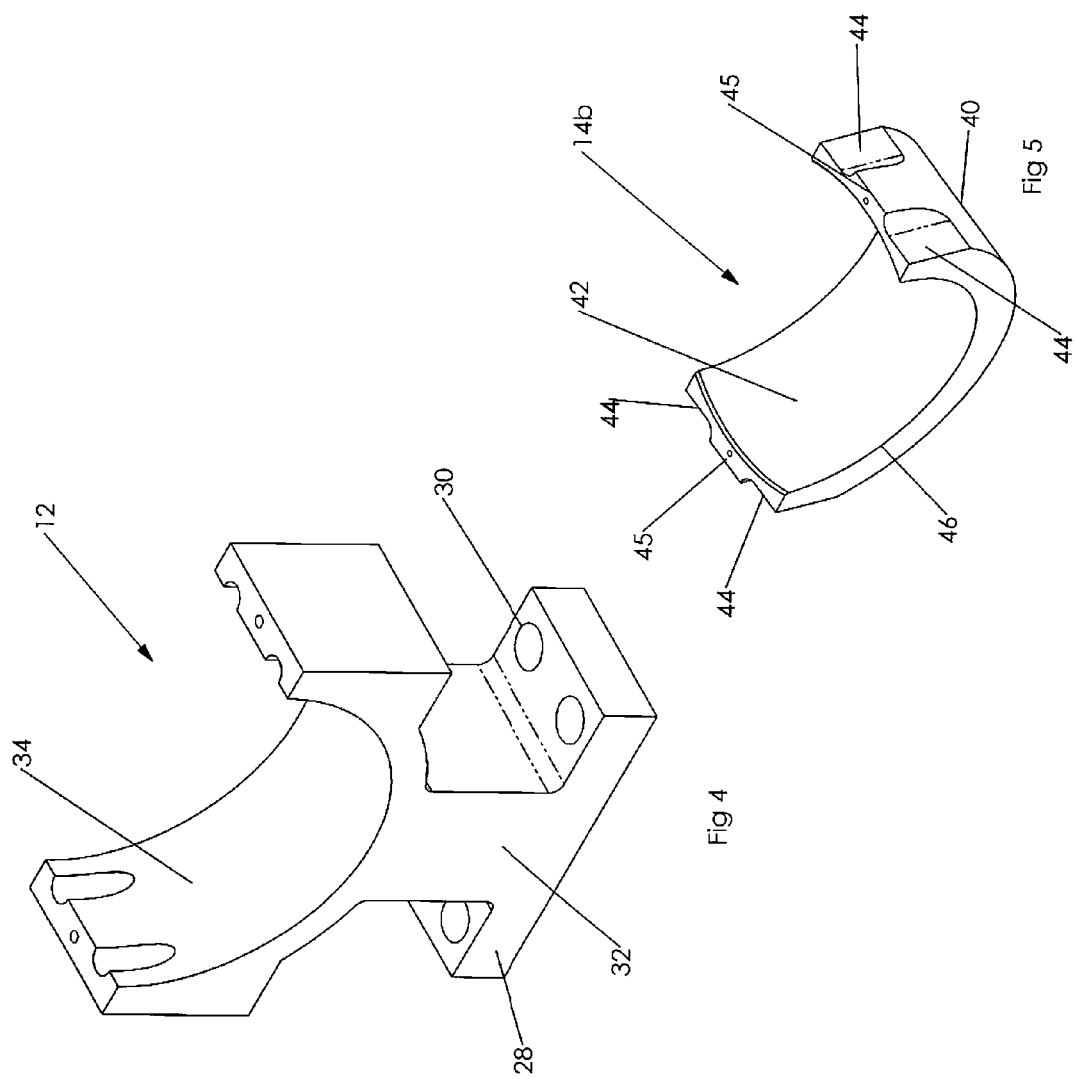

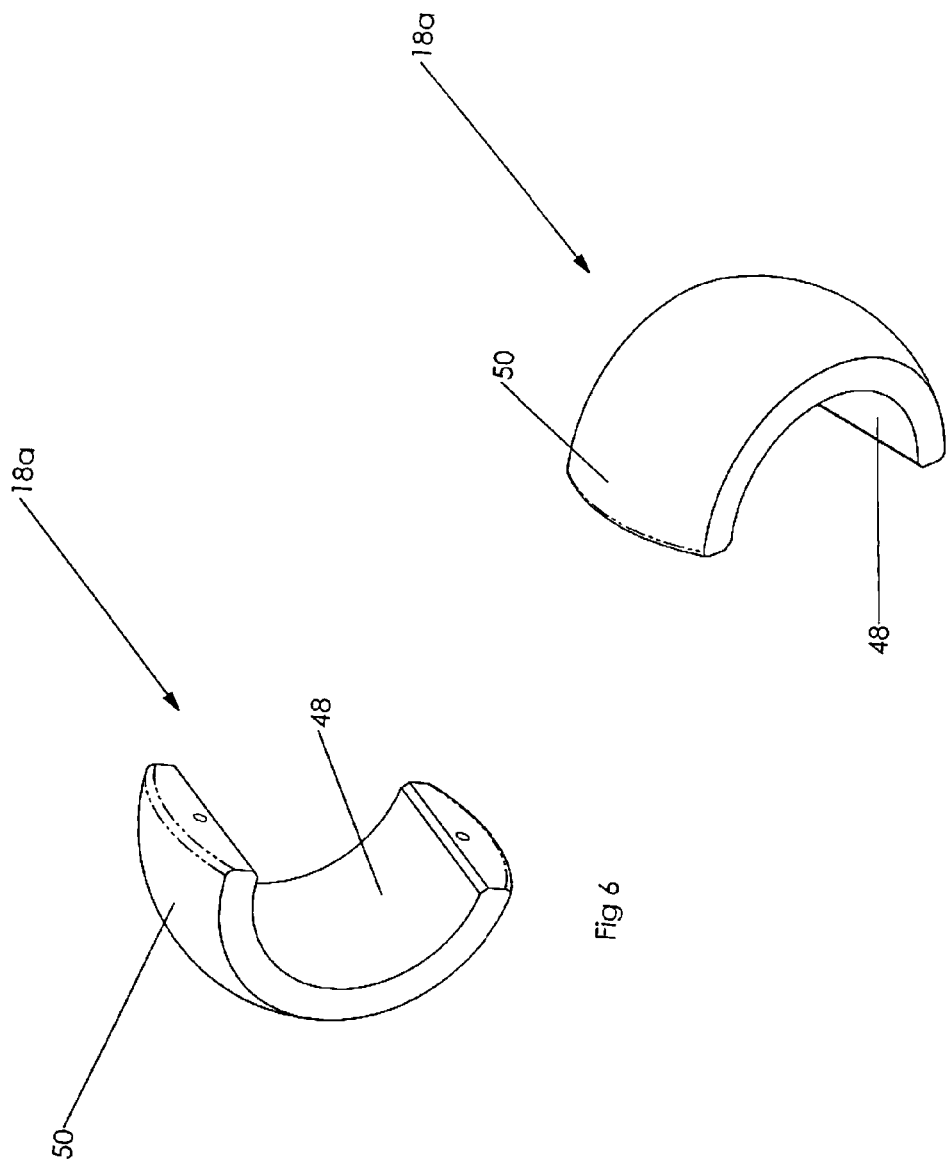

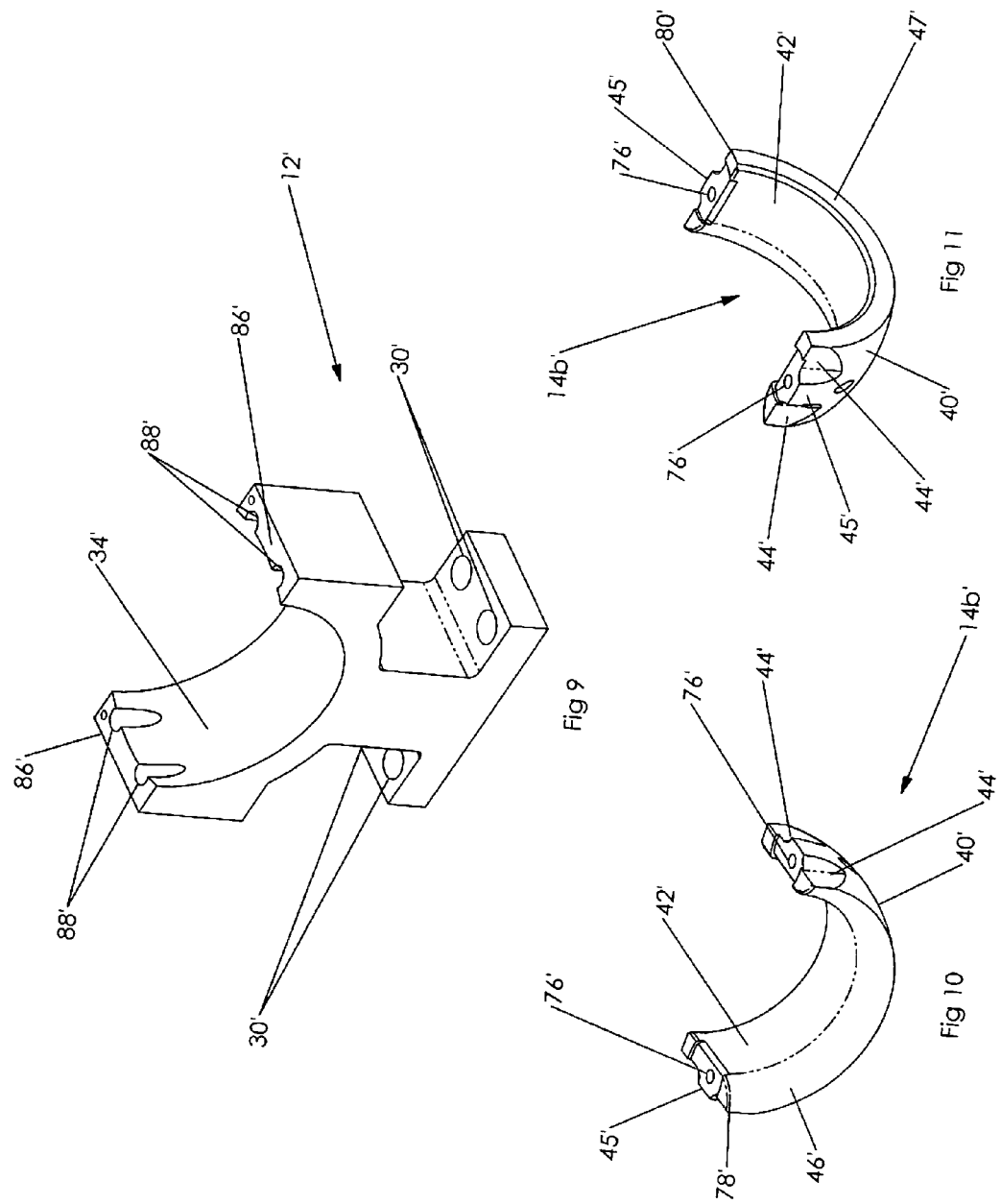

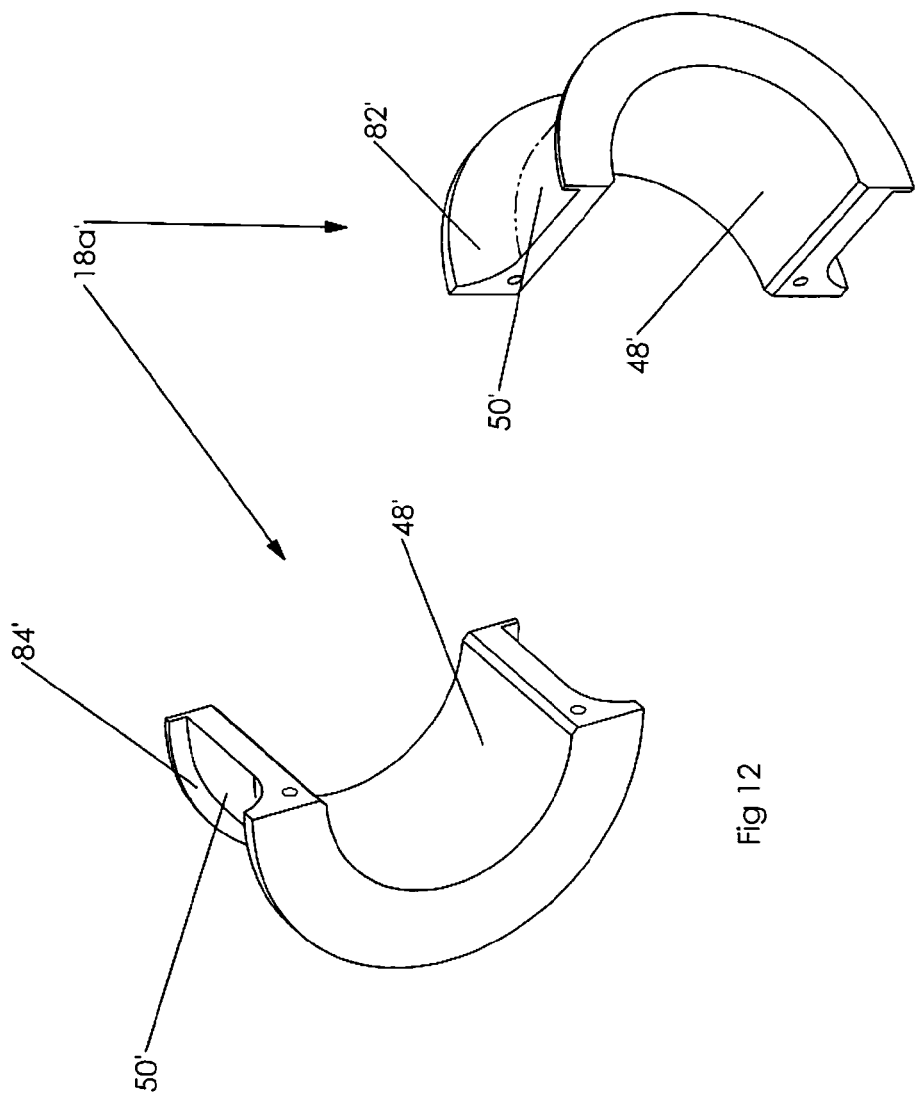

METHOD FOR SUPPORTING LOADS IN A COAL-DUST-LADEN ENVIRONMENT

BACKGROUND

The present invention relates to a bearing arrangement for use in a particulate-laden environment, such as a coal mine, in which the environment is laden with coal dust.

The dusty environment of a coal mine causes moving parts to wear out very quickly. For example, in high wall mining, a mining car is fed into the wall of the mine to remove the coal. The front mining car has a pair of bits and is driven by a separate drive module, which mounts to the rear of the bits to drive them. The front car (or lead car) chews up the coal, and then, as it travels into the wall, the drive module is removed, auger cars are attached to the back of the lead car, and the drive module is attached to the back of the rear auger car, driving the rear augers, which, in turn, drive the other augers and the bits. As the bits chew up the coal, they feed the coal onto the augers, which then carry the coal out of the mine. There has been a big problem with the bearing supports for the auger shafts wearing out very quickly, typically in 2 to 4 weeks of operation. This also damages the auger shaft itself, requiring repair and replacement of the auger shaft. The repairs are expensive, and they delay the mining operation, resulting in lost profits. Thus, it would be very helpful to provide a more reliable support for the augers which lasts longer and does not damage the augers. A similar problem exists for the bearing surfaces of other moving parts that are exposed to the coal dust. It is also envisioned that a similar problem exists in other particulate-laden environments, in which particles get between the opposed mating bearing surfaces and quickly wear out those bearing surfaces.

Many types of seals and lubricants and many bearing designs have been used in the past in an attempt to overcome this problem, with varying degrees of success.

SUMMARY

The present invention involves designing the bearing arrangement so that the particulate material serves as a lubricant rather than as an irritant. This is accomplished by making the bearing surfaces harder than the particulate material and by providing sufficient clearance for the particulate material to enter the space between the bearing surfaces.

BRIEF DESCRIPTION OF THE DRAWINGS

FIG. 1D is a perspective, schematic view of an auger car, including two parallel auger shafts of the type shown in FIG. 1A;

FIG. 3 is an exploded, perspective view of the auger shaft bearing support of FIG. 2A;

FIG. 4 is a perspective view of the pedestal bearing support of FIG. 3;

FIG. 5 is a perspective view of one half of the outer bearing of FIG. 3;

FIG. 6 is a perspective view of one half of the inner bearing of FIG. 3;

FIG. 7 is an opposite-end perspective view of the inner bearing of FIG. 6;

FIG. 9 is a perspective view of the pedestal bearing support of FIG. 8;

FIG. 10 is a perspective view of one half of the outer bearing of FIG. 8;

FIG. 11 is an opposite-end, perspective view of the half of the outer bearing of FIG. 10;

FIG. 12 is a perspective view of one half of the inner bearing of FIG. 8; and

FIG. 13 is an opposite-end, perspective view of the half of the inner bearing of FIG. 8.

DESCRIPTION

Figure 1A:
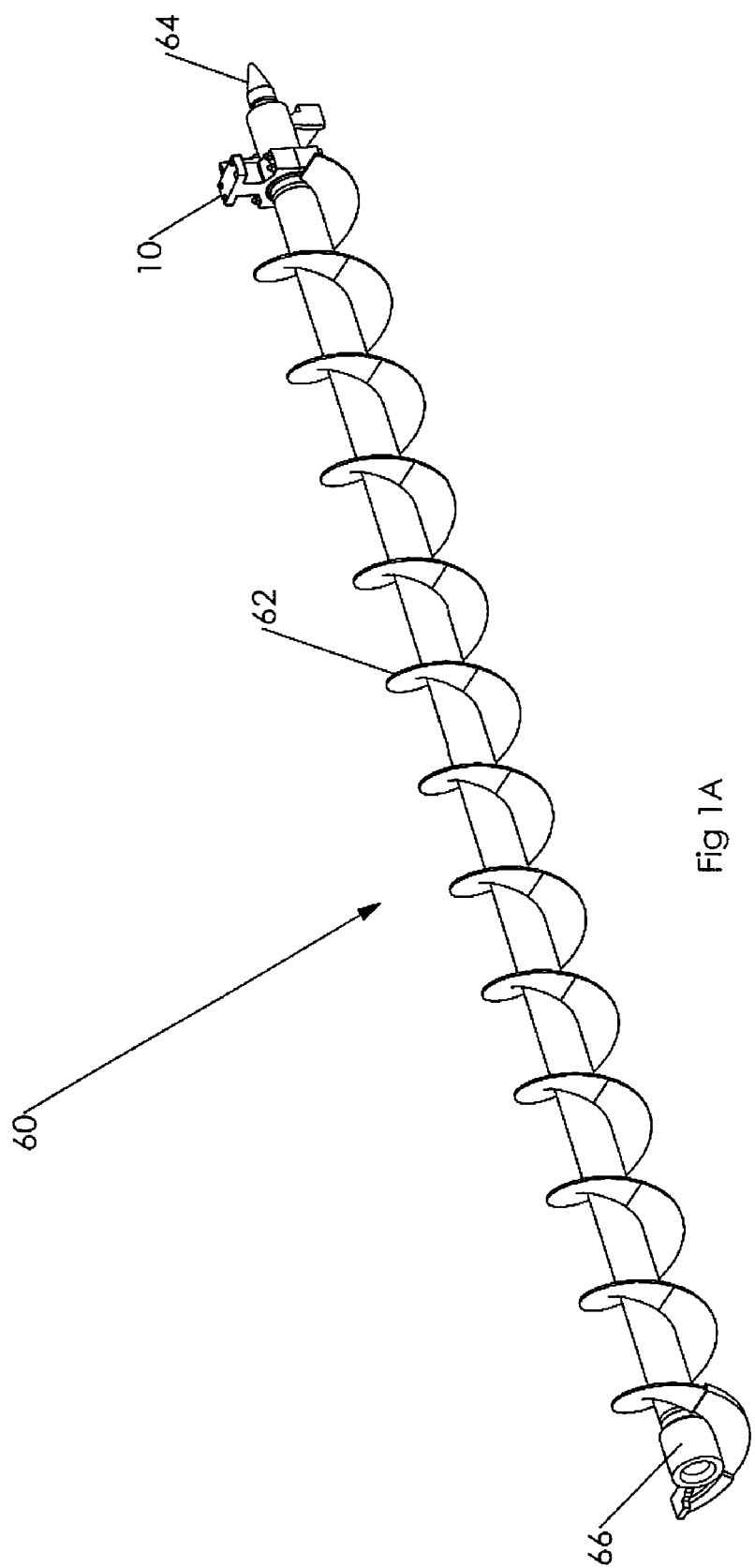
FIG. 1A is a perspective view of an auger shaft including an auger shaft bearing support.
Figure 1B:
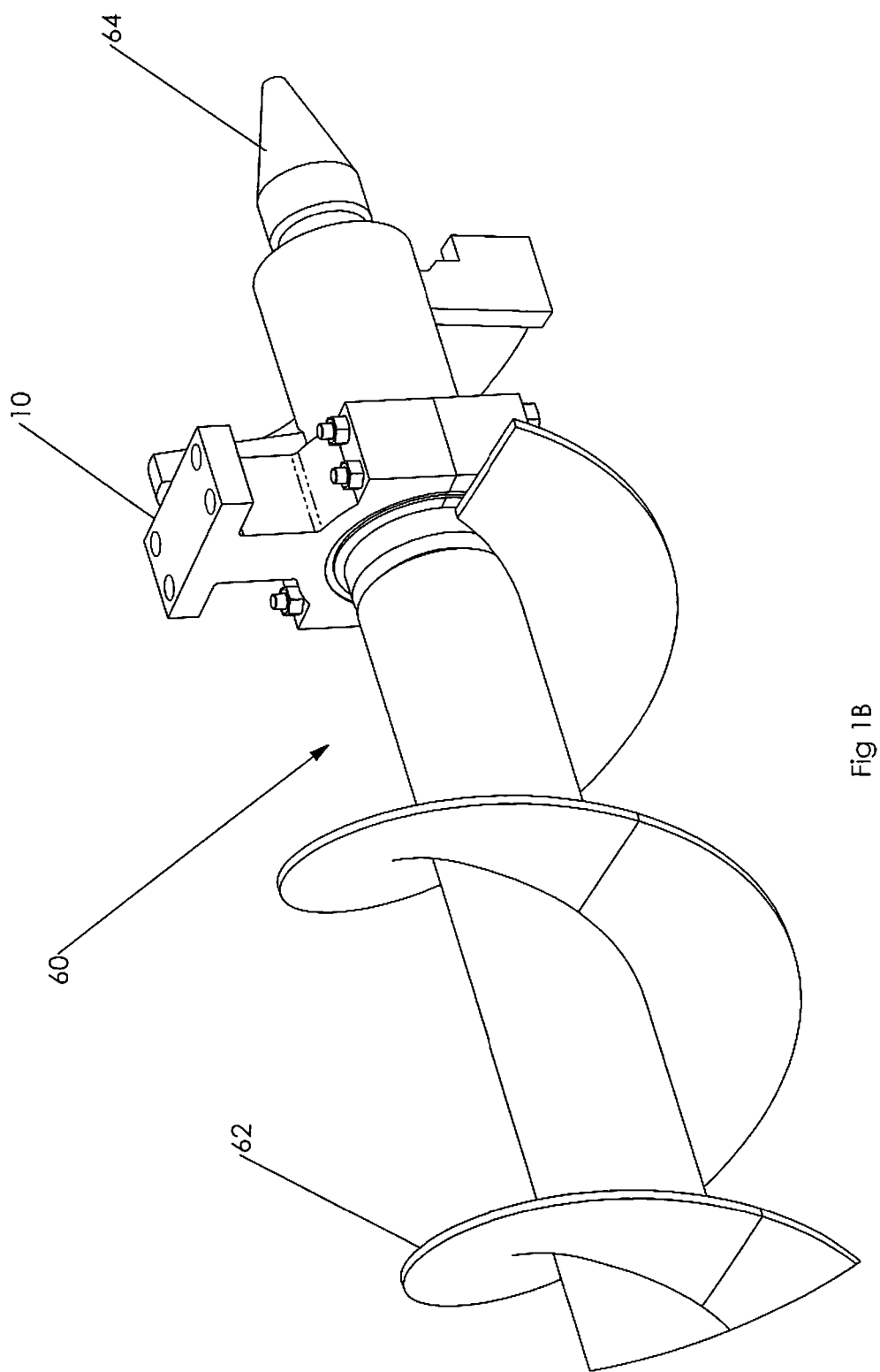
FIG. 1B is a broken-away, enlarged view of one end of the auger shaft of FIG. 1A.
Figure 1C:
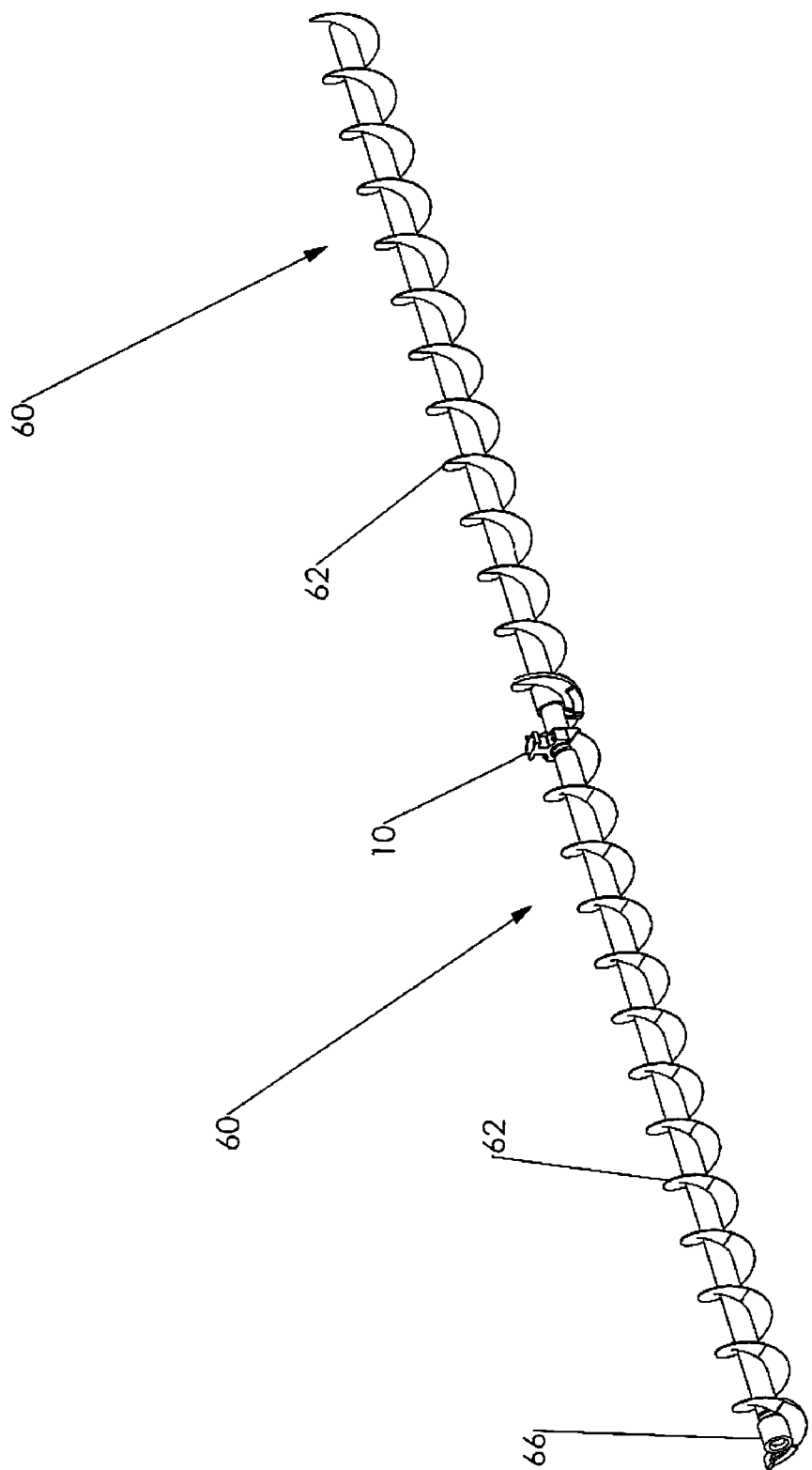
FIG. 1C is a perspective view of two auger shafts of FIG. 1A connected together.

FIGS. 1A-1D show an auger shaft 60, including an auger shaft bearing support 10. The auger shaft 60 is an elongated tubular element defining a screw 62 along its outer surface, a male connector 64 at its first end, and a female connector 66 at its second end. The male connector 64 of one auger shaft 60 engages the female connector 66 of an adjacent, identical auger shaft 60 (as seen in FIG. 1C) in order to form a continuous, multi-part auger shaft which may be made up of several individual auger shafts 60.

In a typical auger car 68 (See FIG. 1D) two auger shafts 60 are placed in a substantially parallel arrangement extending horizontally from the front of the auger car 68 to the rear of the auger car 68, with an auger shaft bearing support 10 mounted to the inside of the structure of the auger car 68 to secure and rotationally support each auger shaft 10 on the auger car 68. An enlarged detail of an auger shaft bearing support 10 mounted onto the auger shaft 60 is shown in FIG. 1B.

The auger shaft bearing support 10 is shown in more detail in FIGS. 2-7 and includes a bearing pedestal 12, which defines a plurality of through holes 30 through which bolts (not shown) pass in order to secure the bearing support 10 to the structure of the auger car 68. It also includes an axially split outer bearing including a lower-half outer bearing 14*b* and an upper-half outer bearing 14*t*, and an axially split inner bearing including a left-half inner bearing 18*a*, and a right-half inner bearing 18*b*. It also includes cap bolts 22, cap bolt nuts 24, and a pedestal cover 26. As discussed in more detail below, the lower and upper outer bearing halves 14*b*, 14*t* are identical, and together they complete the outer bearing assembly 14. Similarly, the left and right inner bearing halves 18*a*, 18*b* are also identical, and together they complete the inner bearing assembly 18. The inner and outer bearings 18, 14 are thus each axially split into two identical halves 18*a*, 18*b* and 14*b*, 14*t* respectively. Note that the designations of upper, lower, left and right are for reference only and do not necessarily reflect the positions of the items in actual operation.

Referring to FIG. 4, the bearing pedestal 12 includes a flat base 28 defining the through holes 30 for securing the base 28 to the auger car 68 (See FIG. 1D). Each auger car 68 contains two parallel auger shafts 60, and each auger shaft 60 has one bearing support 10 mounted near one end of the auger car 68. A vertically-extending web 32 projects from the flat base 28, and this web 32 supports a semi-cylindrical saddle 34 which, in turn, supports the inner and outer bearings 18, 14 respectively, as well as the pedestal cover 26 when the auger shaft bearing support 10 is assembled.

Figures 2A, 2B:
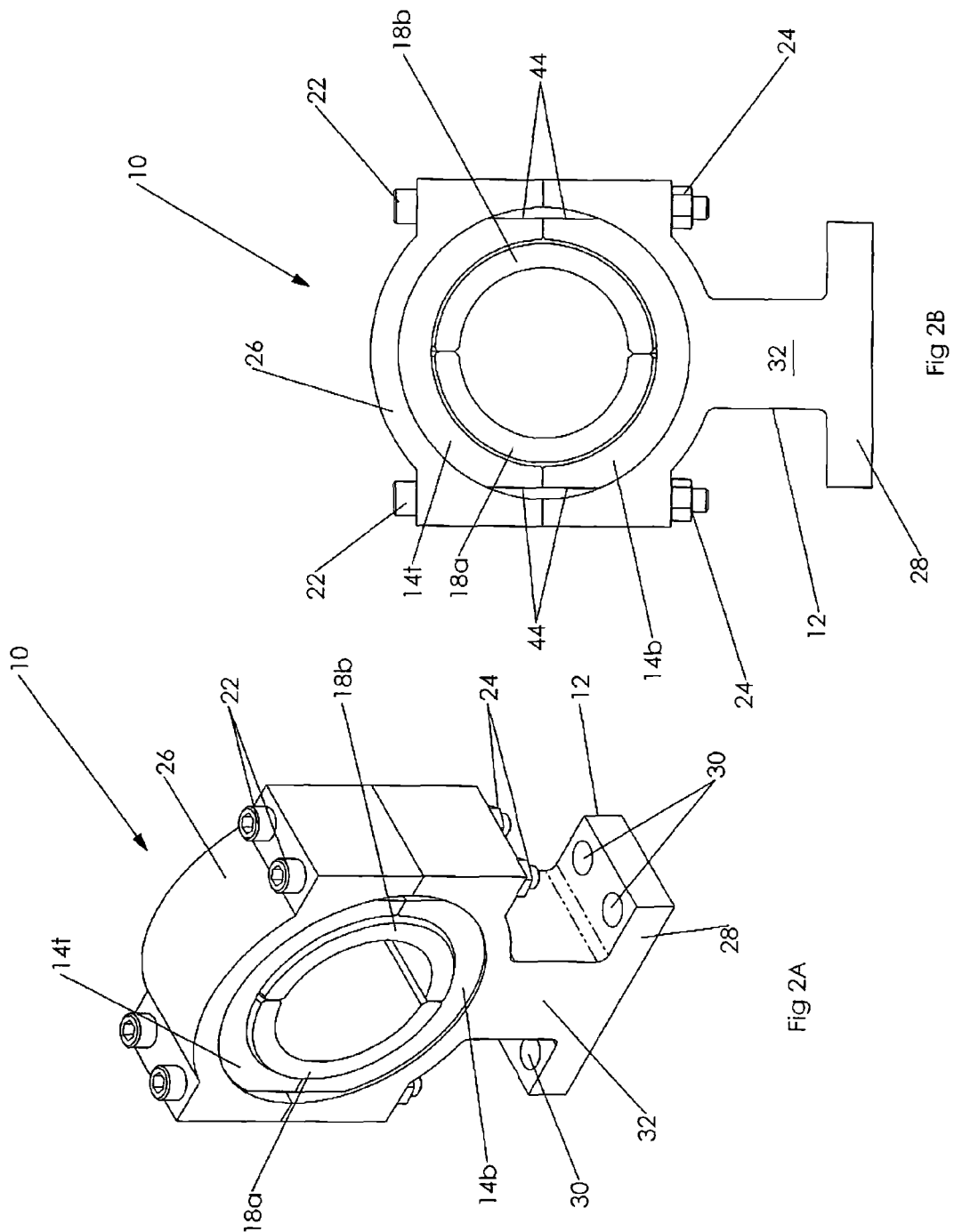
FIG. 2A is a perspective view of the auger shaft bearing support of FIG. 1A.
FIG. 2B is an end view of the auger shaft bearing support of FIG. 2A.
Figure 8:
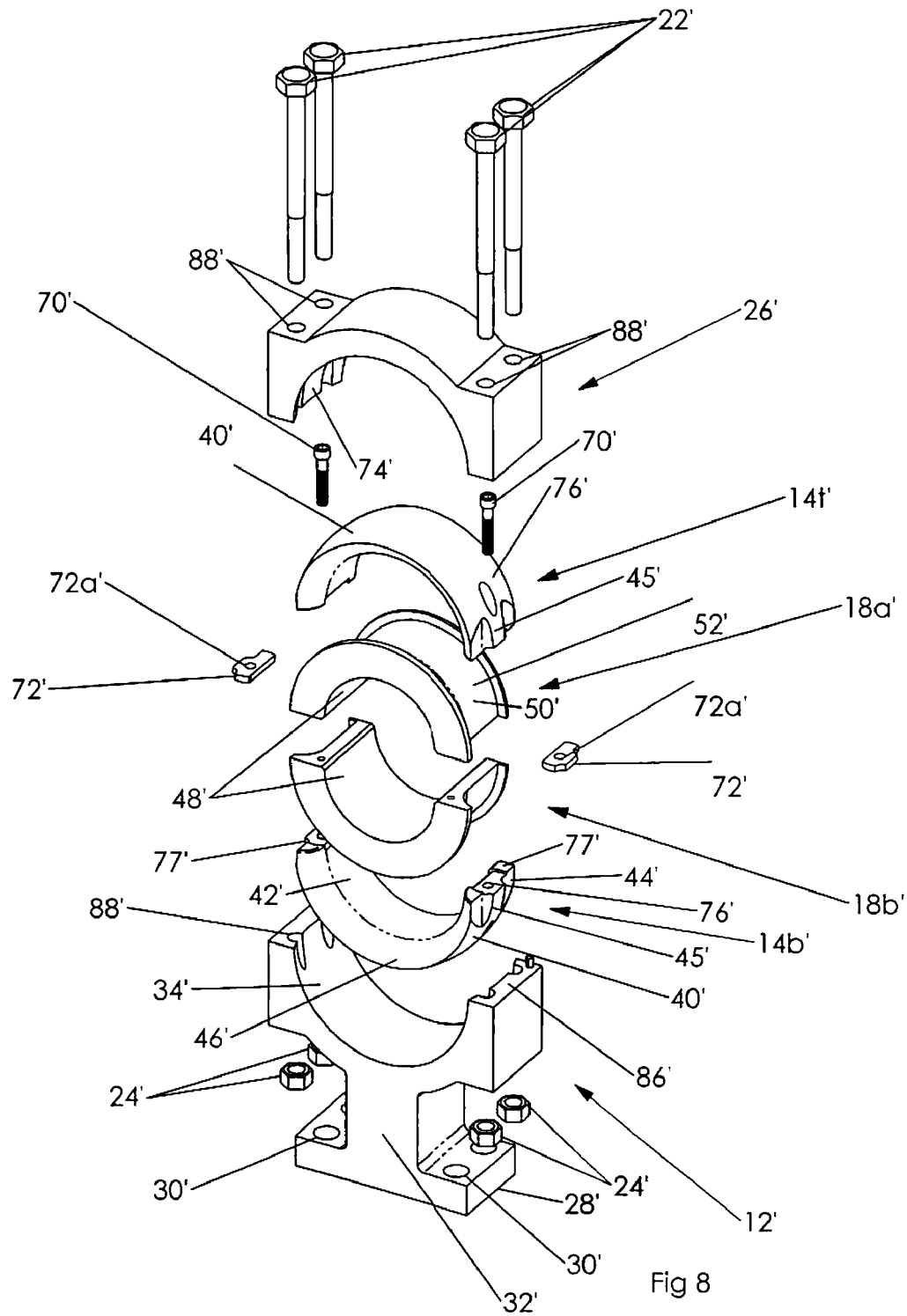
FIG. 8 is an exploded, perspective view of another embodiment of an auger shaft bearing support.

Referring to FIG. 5, the lower-half outer bearing 14b defines a semi-cylindrical outer surface 40 (which rests on the semi-cylindrical saddle 34 of the bearing pedestal 12), and a concave partial spherical inner surface 42 upon which the partial spherical inner bearing 18 rotates, as discussed in more detail below. The outer bearing 14b is made of steel, and it has a hard facing on its inner surface 42 made of tungsten carbide particles dispersed in a nickel-based alloy matrix applied in accordance with Conforma Clad's proprietary process, as shown in FIG. 1 of U.S. Pat. No. 3,743,556, which is hereby incorporated herein by reference, or as shown in FIG. 2 of U.S. Pat. No. 5,236,116, which is hereby incorporated herein by reference. In this particular embodiment, the inner surface 42 has a hard surface coating that is approximately 0.030 inches thick and is the equivalent of Conforma Clad's WC 200 coating, which has a Rockwell C Hardness of 64-70 and is made up of the following percentages by weight:

| | |
|---|---|
| Tungsten Carbide (including cobalt bonded tungsten carbide) | 62% |
| Nickel | 30% |
| Chromium | 6% |
| Other | 2% |

The lower-half outer bearing 14b also defines flats 44 to prevent rotation of the outer bearing 14 as explained herein. The cap bolts 22 press against these flats 44 to lock the outer bearing 14 between the bearing pedestal 12 and its cover 26, and to prevent rotation of the outer bearing 14. Of course, other mechanisms could be used to prevent rotation of the outer bearing 14 relative to the housing, including pinning or bolting the outer bearing to the housing. It should be noted that, between the flats 44, there is a projection 45 such that, when assembled, the cap bolts 22 straddle the projection 45. However, there is a clearance between the cap bolts 22 and the projection 45 which allows some axial movement of the entire outer bearing 14, inner bearing 18, and auger shaft 60 assembly relative to the pedestal 12. In this preferred embodiment, this axial movement is on the order of 1/8" in each direction (fore and aft) for a total allowable axial movement of approximately 1/4". This feature allows for the slight length variations of the augers and the auger housings.

The lower-half outer bearing 14b and the upper-half outer bearing 14t are identical, each having the same tungsten carbide coating on their inner surface 42, and each terminating along a horizontal planar surface. When those horizontal planar surfaces are joined together, they form the outer bearing 14.

Referring now to FIGS. 6 and 7, the left-half inner bearing 18a defines a semi-cylindrical inner surface 48 (which wraps around and is welded to the rotating shaft 60), and a partial spherical convex outer surface 50 which lies opposite to and rotates against the similarly shaped concave-spherical inner surface 42 of the outer bearing 14.

The inner bearing halves 18a, 18b are made of steel, and their outer surfaces 50 are coated with tungsten carbide particles dispersed in a nickel-based alloy matrix in accordance with the Conforma Clad process as described earlier. In this particular embodiment, the coating is the equivalent of Conforma Clad's WC-1200, which has a Rockwell C Hardness of 60-66 and is made up of the following by weight:

| | |
|---|---|
| Tungsten carbide (including cobalt bonded tungsten carbide) | 55% |
| Nickel | 34% |
| Chromium | 7% |
| Other | 4% |

It is preferred for the two opposed bearing surfaces 42, 50 to have hardnesses that differ in order to avoid galling if the two surfaces come into contact with each other. It is preferred that their Rockwell C hardnesses differ by at least 5 points and preferably at least ten points. The thickness of the coating in this embodiment is approximately 0.030 inches.

The left-half inner bearing 18a and the right-half inner bearing 18b are identical, each terminating in a planar surface. When the planar surfaces are joined together, they form the inner bearing 18.

When the inner bearing halves 18a, 18b are welded onto the auger shaft, and the auger shaft bearing support 10 is assembled, there is an initial gap or clearance of about 0.030 inches between the inner surface 42 of the outer bearing 18 and the outer surface 50 of the inner bearing, into which particulates, such as coal dust, can enter. Since both the outer surface 50 of the inner bearing 18 and the inner surface 42 of the outer bearing 14 are coated with tungsten carbide particles in a nickel-based alloy matrix, those surfaces are harder than the coal dust particulates that migrate into the gap or space between those surfaces, so the coal dust serves as a lubricant.

The auger shaft bearing support 10 may be assembled to the auger shaft 60 in the following manner: The left-half and right-half inner bearings 18a, 18b are welded or otherwise secured to the shaft 60, such that, as the shaft 60 rotates, the inner bearing 18 rotates with it. The two-piece design of the inner bearing 18 facilitates the mounting of the inner bearing 18 to the shaft 60 without having to disassemble or remove any items mounted to the ends 64, 66 of the shaft 60 (such as additional shafts 60). The flat, planar ends of the inner bearing halves 18a, 18b are aligned along a diameter of the cylindrical auger shaft 60.

The lower-half outer bearing 14b is placed on the bearing pedestal 12, and these two items 12, 14b are placed under the shaft-mounted inner bearing 18. The pedestal 12 may then be bolted to the frame of the auger car 68 using bolts (not shown) which go through the holes 30 in the pedestal 12. The upper-half outer bearing 14t is then placed over the inner bearing 18 and abutting the lower-half outer bearing 14b. The pedestal cover 26 is then placed over the upper half outer bearing 14t, and the entire assembly is secured with the cap bolts 22 and the corresponding nuts 24. The cap bolts 22 press against the flats 44 of the outer bearing 14 to keep this outer bearing 14 within the auger shaft bearing support 10 and to prevent the rotation of the outer bearing 14.

The concave partial spherical inner surface 42 of the outer bearing 14 secures the similarly shaped convex partial spherical outer surface 50 of the inner bearing 18, which lies opposite to it. These partial spherical surfaces also allow for some misalignment of the auger shaft 60 relative to its bearing support 10 and provide support for thrust forces acting axially along the shaft 60.

As in the case of the inner bearing 18, the two-piece design of the outer bearing 14 also allows the quick and easy removal and installation of the outer bearing 14 without having to disassemble or remove any items mounted to the ends of the shaft 60.

An initial lubricant may be added into the space between the opposed inner and outer bearing surfaces before the bearing is put into operation, if desired, to ensure that there is some lubrication between the surfaces before the particulate matter from the environment (in this case coal dust) migrates into the space to provide lubrication. In that case, the initial lubricant may be grease, coal dust, or any other desired lubricant material.

As the coated surfaces wear, the gap between them increases. When the gap reaches a predetermined point (before the coatings have worn all the way through), the inner and outer bearings 18, 14 are replaced. This ensures that the auger shafts remain in alignment, preventing damage to the shafts, housings, and other parts.

FIGS. 8-13 illustrate another embodiment of an auger shaft bearing support 10'. This auger shaft bearing support 10' is similar to the auger shaft bearing support 10 described above, and includes a bearing pedestal 12', which defines a plurality of through holes 30' through which bolts (not shown) pass in order to secure the bearing support 10' to the structure of the auger car 68. It also includes an axially split outer bearing including a lower-half (or bottom half) outer bearing 14b' and an upper-half (or top half) outer bearing 14t', and an axially split inner bearing including an upper-half inner bearing 18a', and a lower-half inner bearing 18b'. It also includes cap bolts 22', cap bolt nuts 24', and a pedestal cover 26'. Unlike the previous embodiment, this embodiment 10' also includes assembly bolts 70', and spacers 72'. Also, the physical shape of the inner bearing halves 18a', 18b', the outer bearing halves 14b', 14t', the pedestal 12', and the cover 26' differ from those described earlier, as explained below. Again, note that the designations of upper and lower (or top and bottom) are for reference only and do not necessarily reflect the positions of the items in actual operation.

Referring to FIG. 9, the pedestal (or housing) 12' is similar to the pedestal 12 of FIG. 4. However, the internal surface 34' has a concave partial spherical saddle profile, instead of the cylindrically-shaped saddle 34 of the earlier embodiment 10. Similarly, the corresponding internal surface 74' of the pedestal cover 26' (See FIG. 8) also has a concave partial spherical saddle profile.

The pedestal cover (or housing cover) 26' is substantially identical to the pedestal 12' (excluding the vertical web 32' and the flat base 28' of the pedestal 12'). Both the pedestal 12' and its cover 26' end in substantially planar edges 86' lying along a plane extending through the longitudinal axis of the bearing support 10'. Both the pedestal 12' and its cover 26' define housing-securement openings 88' extending from the outer surface of the pedestal 12' or cover 26' to its respective planar edge 86'.

Referring now to FIGS. 10 and 11, the lower-half outer bearing 14b' has an arcuate outer surface 40' which defines a convex partial sphere (which, when assembled, rests on the concave partial spherical saddle 34' of the bearing pedestal 12'), and an arcuate inner surface 42' which defines a partial cylinder upon which, when assembled, the cylindrical inner bearing halves 18a', 18b' rotate, as discussed in more detail below.

The lower-half outer bearing 14b' also defines flats 44' to prevent rotation of the outer bearing 14', as described below. When assembled, the cap bolts 22' press against these flats 44' to lock the outer bearing 14' between the bearing pedestal 12' and its cover 26' and to prevent rotation of the outer bearing 14'. It should be noted that between the flats 44', there is a projection 45' such that, when assembled, the cap bolts 22' straddle the projection 45'. There is a clearance between the cap bolts 22' and the projection 45' which may allow some axial movement of the outer bearing halves 14b', 14t', inner bearing halves 18a', 18b', and auger shaft 60 assembly relative to the pedestal 12'. However, the concave-partial-spherical saddle profile of the inner surface 34' of the pedestal 12' prevents any such axial motion of the outer bearing. On the other hand, this combination of the clearance between the cap bolts 22' and the projection 45' which they straddle, and the concave-partial-spherical saddle profile of the inner surface 34' of the pedestal 12' does allow for an oscillation (or rocking motion) of the outer bearing relative to the pedestal 12'. This feature, in combination with the generously radiused thrust face 46' of the outer bearing 14', promotes automatic radial centering of the outer bearing 14' relative to the inner bearing 18' as described in more detail later.

The identical outer bearing halves 14b', 14t' define aligned threaded openings 76', which enable them to be assembled together using the assembly bolts 70'. Spacers 72' fit into recesses in the substantially planar edges 77' at the ends of the outer bearing halves and are sandwiched between the ends of the upper and lower outer bearing halves 14t', 14b' to form a complete outer bearing assembly 14' with a known and true circular shape as described in more detail below. The spacers 72' also have securement openings 72a' through which the assembly bolts 70' pass.

Finally, the axial edges of the interior surface of the upper and lower outer bearing halves 14t', 14b' define forward and rear thrust faces 46', 47' (See FIGS. 10 and 11) which engage the corresponding forward and rear thrust faces 82', 84' of the inner bearing halves 18a', 18b' as described in more detail below. It should be noted that, in this embodiment, the forward thrust face 46' has a wider surface and a radiused profile 78' (See FIG. 10), in contrast with the rear thrust face 47' which has a narrower, axially-aligned surface and a flat profile 80' (See FIG. 11). The forward thrust face 46' has some components which are substantially parallel to, and some components which are substantially perpendicular to, the axial direction of the outer bearing halves 14a', 14b'.

When assembled, the outer bearing 14' has inner and outer surfaces 42', 40' which are symmetrical about a longitudinal axis. As described with respect to the first embodiment, the outer bearing 14' is made of steel, and the inner surface 42' and forward and rear thrust surfaces 46', 47' are coated with a composite of tungsten carbide particles dispersed in a nickel-based alloy matrix as described earlier with respect to the previous embodiment. In this embodiment, these surfaces 42', 46', 47' are coated with the equivalent of WC-1000, which was described above. As in the previous embodiment, the coating is approximately 0.030 inches thick.

Each outer bearing half 14b', 14t' ends in substantially planar edges 77' lying along a plane extending through the longitudinal axis. As has also already been described, each outer bearing half 14b', 14t' defines first and second vertical outer-bearing-securement openings 76' extending from the outer surface 40' to its respective planar edge 77'. These outer-bearing-securement openings 76' may be at least partially internally threaded such that the assembly bolts 70' may be threaded to secure the outer bearing assembly 14'. As has also already been noted, the outer bearing assembly 14' may also include one or more spacers or inserts 72', wherein each insert defines an insert securement through opening 72a' which aligns with the outer-bearing-securement opening 76'.

As explained in more detail below, the forward thrust face 46' is designed to take the larger thrust load, while the rear thrust face 47' is designed to keep the bearing from falling out in that direction. This design allows the bearing 10' to maximize the surface area available to carry radial loads by maximizing the surface area 42' of the outer bearing halves 14t', 14b', given the overall width constraints of the bearing support 10'.

In other words, given a maximum overall width of the outer bearing halves in the front-to-rear (or axial) direction, if both forward and rear thrust faces 46' and 47' were generously radiused, then the surface area 42' available for carrying radial loads would be less than if both thrust faces 46' and 47' had no radius at all (that is, if they both had the flat profile of the thrust face 47'). On the other hand, if both thrust faces 46' and 47' had a flat profile in order to provide a greater surface area 42' for carrying radial loads, then the thrust bearing capability of the bearing 10' would be reduced, and there would be no radially-self-centering characteristic of the outer bearing 14' relative to the inner bearing 18' (as described below).

The outer bearing 14' is unable to rotate relative to the housing (pedestal) 12' because the cap bolts 22' abut the flats 44'. However, the partial-spherical outer surface 40' of the outer bearing 14' is able to rock (or oscillate) relative to the reverse-partial-spherical surface 34' of the housing 12', at least to the extent that there is a clearance between the cap bolts 22' and the projection 45' which is straddled by the cap bolts 22'. That is, the outer bearing 14' can pivot relative to the pedestal 12' and cover 26', like a ball in a socket, within the confines allowed by the cap bolts 22' straddling the projection 45'. Therefore, if there is some misalignment between the shaft (and therefore also between the inner bearing 18' which is secured to the shaft) and the housing 12', the outer bearing 18' can pivot (oscillate) to account for some, if not all, of the misalignment. The generously radiused thrust face 46' of the outer bearing in contact with the similarly profiled thrust face 82' of the inner bearing 18' promotes this automatic radial centering of the outer bearing relative to the inner bearing.

As was the case for the previously described bearing 10, the lower-half outer bearing 14b' and the upper-half outer bearing 14t' are identical, each terminating along a horizontal planar surface 77'. When those horizontal planar surfaces 77' are joined together and including the spacers 72', they form the outer bearing. The spacers or inserts 72' permit some compensation for tolerances in the dimensions of the outer bearing halves 14t', 14b' to ensure that the outer bearing 14' forms a true, known diameter for rotational support of the inner bearing.

Referring now to FIGS. 12 and 13, the upper inner bearing half 18a' (which is identical to the lower inner bearing half 18b') defines a semi-cylindrical inner surface 48' (which wraps around and is secured, as by welding, to the rotating shaft 60), and a semi-cylindrical outer surface 50' which lies opposite to and rotates against the similarly shaped cylindrical inner surface 42' of the outer bearing halves 14t', 14b'. These inner and outer surfaces 48', 50' are symmetrical about the longitudinal axis of the bearing support 10'.

The cylindrical outer surface 50' is coated with a composite of tungsten carbide particles dispersed in a nickel-based alloy matrix as described earlier. In this embodiment, the coating is the equivalent of WC-1200 and is approximately 0.030 inches thick. Each inner bearing half 18a', 18b' also defines forward and rear circumferential thrust flanges 82', 84', and the surfaces of those thrust flanges that lie opposite to and rotate against the thrust surfaces 46', 47' of the outer bearing 14' also are coated with the equivalent of WC-1200. The forward circumferential thrust flange 82' has a generously radiused arcuate contour, which matches the similar generously radiused arcuate contour forward thrust face 46' of the respective outer bearing half 14t', 14b'. The rear circumferential thrust flange 84' has a short and flat profile, which matches the similar flat profiled rear thrust face 47' of the respective outer bearing half 14t', 14b'.

As alluded to earlier, the generously radiused forward thrust face 46' of the outer bearing not only makes a larger surface available for carrying axial thrust loads; it also acts to automatically keep the outer bearing halves 14t', 14b' radially centered with respect to the inner bearing halves 18a', 18b', regardless of the amount of wear on the forward thrust face 46', ensuring longer lasting wear characteristics of the bearing 10'.

Any combination of radial and thrust loads imparted by the shaft to the inner bearing 18' is transferred to the outer bearing 14' and the pedestal 12'. The outer bearing 14' oscillates (rocks or pivots) to align itself with the shaft, urged to do so by the centering action of the generously radiused thrust face 82' of the inner bearing 18' acting against the correspondingly generously radiused thrust face 46' of the outer bearing 14'.

The upper and lower inner bearing halves 18a', 18b' are identical, each terminating in a substantially planar surface. When the planar surfaces are joined together, they form the inner bearing 18' which in this embodiment is made from a heat treated, low alloy steel that has been coated with tungsten carbide on its outer surface, as described earlier.

The assembly of this auger bearing support 10' is similar to that of the previously described auger bearing support 10, except for two differences. In this instance, there is an additional step of assembling the spacers 72' to the upper and lower outer bearing halves 14t', 14b' using the assembly bolts 70'. Note that the spacers 72' are not strictly required for the proper operation of this embodiment. Their purpose is to accommodate tolerances in manufacture of the parts in order to ensure a truly circular inner profile. The second additional step in the assembly of this bearing 10' is that care should be exercised to ensure that the bearing 10', which is radially asymmetrical, is assembled onto the auger shaft 60 such that any operational thrust loads are taken up by the thrust faces 46', 82' of the corresponding bearings 14', 18'. As was described with respect to the first embodiment, there is an initial gap of about 0.030 inches between the inner surface 42' of the outer bearing 14' and the outer surface 50' of the inner bearing 18', and an initial lubricant may be placed into that gap when the product is assembled, if desired. Thereafter, the particulate matter in the environment (in this case coal dust) will migrate into that gap and will serve as a lubricant.

While the two embodiments shown here are for use in an auger car and have very specialized designs, there are many applications in which there are two bearing surfaces that are exposed to an environment that is heavily laden with particulates and that would benefit by a design in which two opposed coated surfaces which are harder than the particulates can be used, with the particulates serving as a lubricant between those surfaces. In these embodiments, the two opposed bearing surfaces are arcuate and rotate relative to each other. In another embodiment, the relative shapes could be different and the relative motion could be different, such as linear. It will be obvious to those skilled in the art that various modifications may be made to the embodiments described above without departing from the scope of the present invention as claimed.

What is claimed is:

1. A method for supporting loads in a coal-dust-laden environment, comprising the steps of:
    providing first and second opposed bearing surfaces; and
    introducing coal dust between said first and second opposed bearing surfaces to serve as a lubricant, wherein both said first and second opposed bearing surfaces have a Rockwell C Hardness greater than 50 and include a surface coating with tungsten carbide particles dispersed in an alloy matrix, and wherein said first bearing surface rotates with an auger shaft, and said second bearing surface supports said first bearing surface and said auger shaft as the auger shaft rotates.

2. A method for supporting loads in a coal-dust-laden environment as recited in claim 1, wherein one of said first and second coated bearing surfaces has a Rockwell C hardness at least five points greater than the other of said first and second coated bearing surfaces.

3. A method for supporting loads in a coal-dust-laden environment as recited in claim 1, wherein said auger shaft is part of an auger that conveys coal.

\* \* \* \* \*